(No Model.) 2 Sheets—Sheet 1.
E. C. ELLWOOD.
HAND CULTIVATOR.
No. 384,351. Patented June 12, 1888.
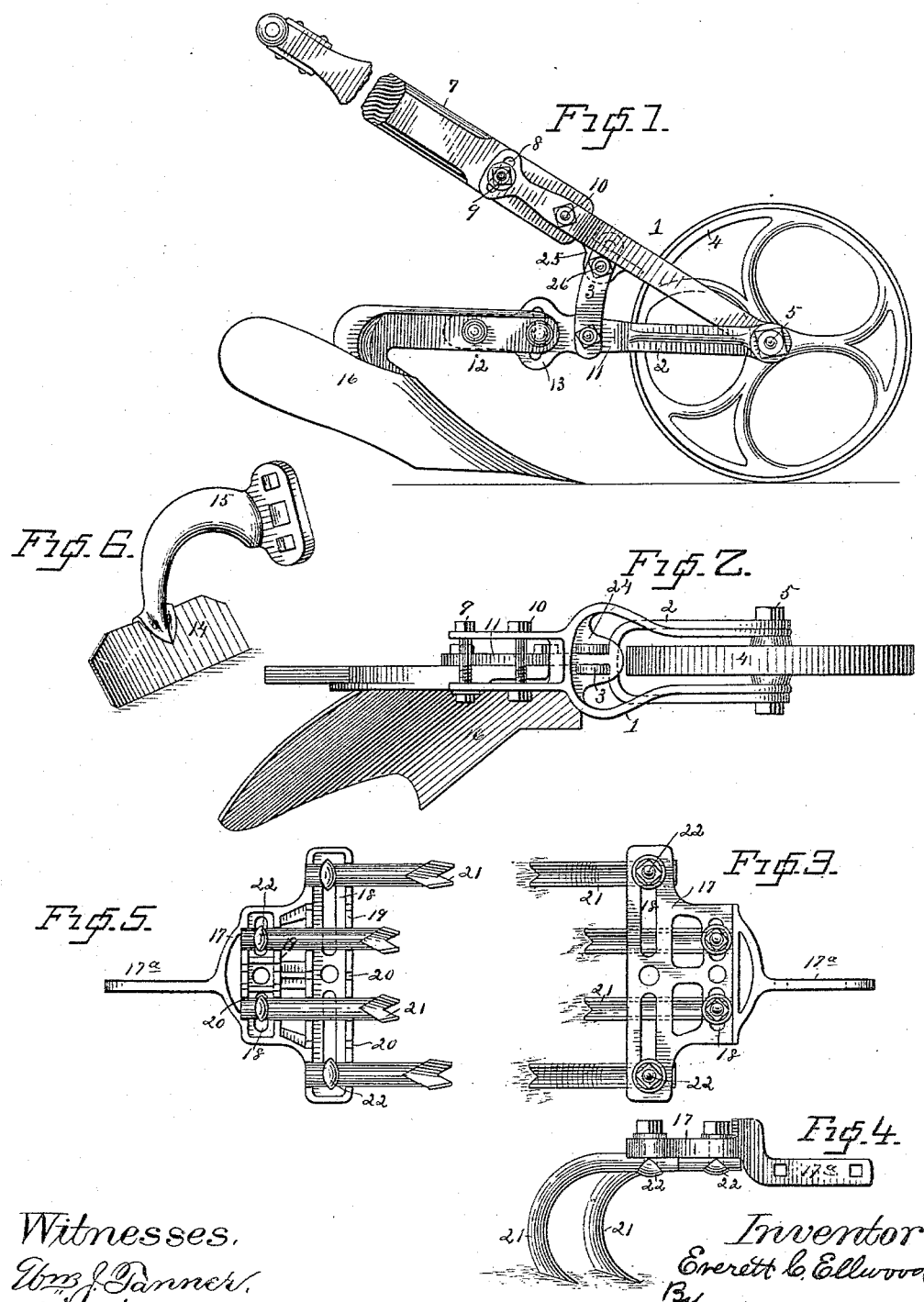
Witnesses.
Wm. J. Tanner.
C. M. Newman.
Inventor
Everett C. Ellwood.
By J. N. Wooster, Atty.

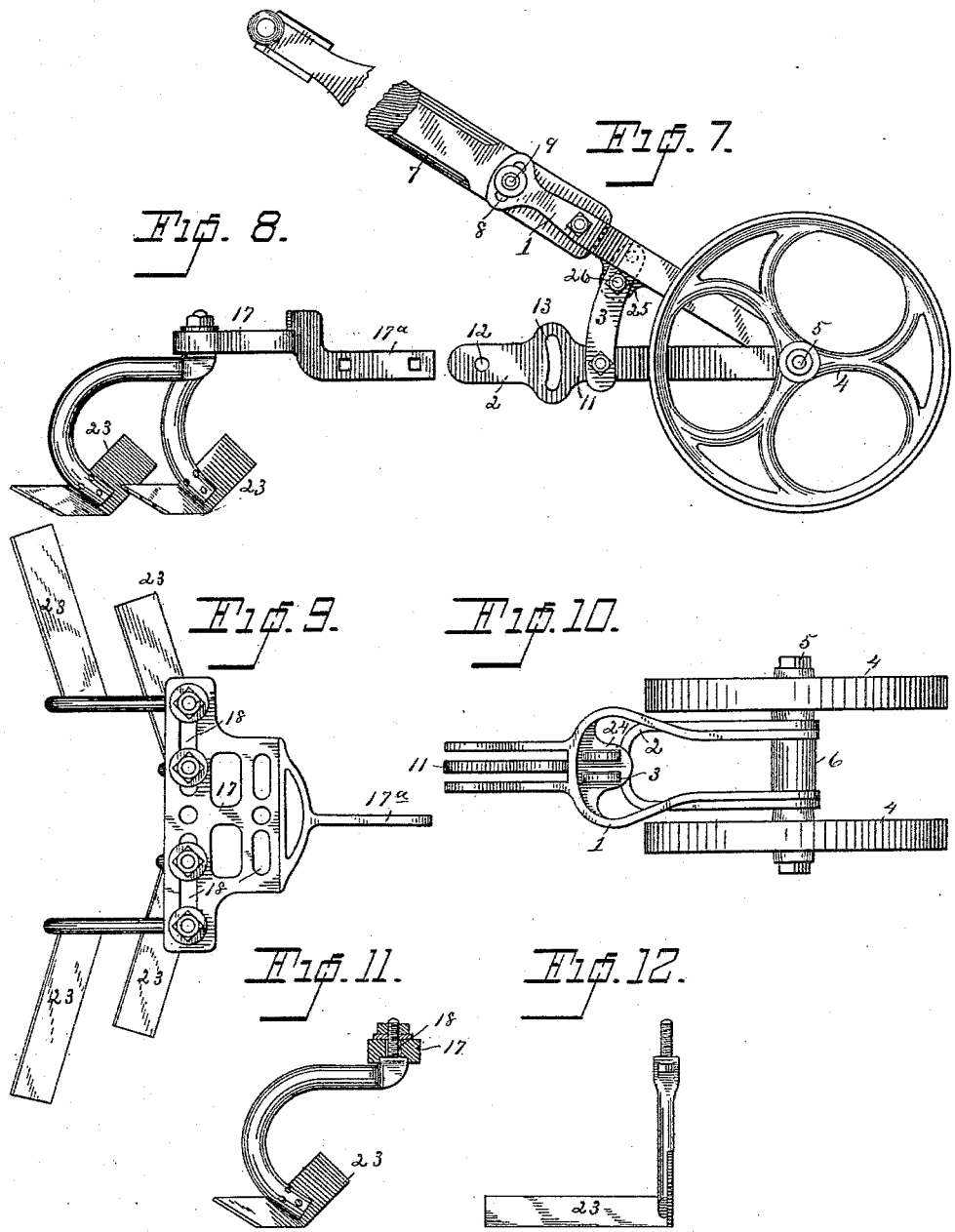

UNITED STATES PATENT OFFICE.

EVERETT C. ELLWOOD, OF GREEN'S FARMS, CONNECTICUT.

HAND-CULTIVATOR.

SPECIFICATION forming part of Letters Patent No. 384,351, dated June 12, 1888.

Application filed March 26, 1888. Serial No. 268,471. (No model.)

*To all whom it may concern:*

Be it known that I, EVERETT C. ELLWOOD, a citizen of the United States, residing at Green's Farms, in the county of Fairfield and State of Connecticut, have invented certain new and useful Improvements in Hand-Cultivators; and I do hereby declare the following to be a full, clear, and exact description of the invention, such as will enable others skilled in the art to which it appertains to make and use the same.

My invention has for its object to produce an implement of this class which shall be very light, simple in construction, and consisting of few parts, capable of many changes in adjustment, and which shall be so constructed and arranged that the bolt holes and slots for adjustment can be cast in the parts, thereby avoiding machine-work and reducing the cost of construction to the minimum. It is of course well understood that different conditions of soil and crops require different operative parts. The use of different implements for wet and dry soil, for weedy soil, and for different sizes and kinds of plants being inconvenient and expensive, I have devised an implement consisting of few pieces but adapted to the various crops requiring this class of cultivation, whether in drills or set in any other order, and provided with operative parts which adapt it to all the different conditions of crops and soil.

In the accompanying drawings, forming part of this specification, Figure 1 is an elevation, and Fig. 2 a plan view, of a single cultivator. Figs. 3, 4, and 5 are respectively a plan view, side elevation, and inverted plan view, illustrating the manner in which I secure ordinary cultivator-teeth to a detachable platform. Fig. 6 is a perspective of one style of hoe; Fig. 7, a side elevation of the machine arranged as a double or straddle cultivator; Fig. 8, a side elevation, and Fig. 9 a plan view, of the platform with another style of hoes secured thereto; Fig. 10, a plan view corresponding with Fig. 7; Fig. 11, a cross-section of the end of the platform, illustrating the manner in which the hoes are attached, and Fig. 12 is an elevation of a special form of hoe which in use is also attached to the platform.

The frame-work of the implement consists solely of upper and lower arms, denoted, respectively, by 1 and 2, which lie at an angle to each other and are connected by braces 3. The arms are both bifurcated to embrace the wheel, which is denoted by 4. The wheel is journaled upon a bolt, 5, which passes through its hub and through the ends of both branches of the bifurcated arms, which are enlarged to give additional strength at its point without materially increasing the weight. As shown in Fig. 2, the branches of the upper arm lie close against the hub of the wheel, on opposite sides thereof, and the branches of the lower arm just outside of these, the single bolt 5 holding the parts firmly together, but at the same time allowing the wheel to turn freely. The double cultivator (see Fig. 10) is organized in substantially the same manner, the only difference being that the bolt is longer, the two wheels are journaled outside of the branches of the arms, and a block, 6, placed between the branches of the upper arm, as clearly shown in said Fig. 10. The handle, denoted by 7, is secured to the upper arm, the rear end of which is also, preferably, bifurcated to embrace the lower end of the handle. At the outer ends of the branches, at the rear end of the upper arm, I preferably cast slots 8. A bolt, 9, passing through these slots and through the handle, permits vertical adjustment of the handle, if required. A short distance forward of these slots the end of the handle is secured by another bolt, 10, which passes through holes in the rear branches of arm 1 and through the handle, whereby the end of the latter is held firmly. The rear end of the lower arm is a single bar, denoted specifically by 11, which is provided with a hole, 12, and a slot, 13. In manufacturing, the holes and slots are formed in the pattern and leave their own cores in the molds, so that said holes and slots can be cast clean, which insures similarity in the castings, thereby making all the parts interchangeable and wholly avoiding the expense of drilling and milling in a machine-shop, said operations being an important item in the cost of manufacturing this class of implements. The lower ends of braces 3 are pivoted to the opposite sides of bar 11, which forms the rear end of the lower arm. The upper arm is provided with a web, 24, just back of the edge of the wheel, which braces and strengthens the branches, and has depending downward therefrom a lug, 25, having a hole through it. The web is provided with two slots, through which the ends of the braces pass, and the upper ends of the braces are provided with one or more holes adapted to register with the hole through the lug. A bolt, 26, passing through the hole in the lug and through corresponding holes in the braces, acts to hold the parts rigidly together.

It will be seen that this construction, simple as it is, gives great strength and perfect rigidity and transmits downward pressure upon the handle to the blades or teeth carried by the platform or by bar 11, and, furthermore, that by providing a series of holes at the upper ends of the braces I secure an additional means of adjusting the height of the handle. This is an important feature, as considerable change is frequently required in the height of the handle to adapt the implement to different operators and different uses.

14 (see Fig. 6) denotes an ordinary scuffle-hoe, whose curved standard 15 is, in use, bolted to bar 11, the bolts passing through the hole and slot in said bar, the slot serving as a ready means of adjustment of the angle of the blade.

16 (see Figs. 1 and 2) denotes a plow, which is attached to bearing 11 in the same manner as the scuffle-hoe. It will be noticed that in order to show the shape of the standard and blade of the scuffle-hoe it is shown tilted forward out of operative position. In use the blade will lie at a very acute angle to the surface of the soil, the tool acting as a weed-cutter. The plow acts to break up hard or weedy soil, and may be used to hill up larger-sized plants. When either plow or scuffle-hoe has been properly adjusted, the bolts are screwed up tight to lock it in place.

17 denotes a platform, which is attached to bar 11 in the same manner as the plow and scuffle-hoe—that is, by bolts passing through hole 12 and slot 13 in bar 11, and through holes registering therewith in standard 17ᵃ at the forward end of the platform. This platform is provided with slots 18 and with ribs 19 on its under side having notches 20, the construction being such as to secure lightness, combined with great strength.

21 denotes ordinary cultivator-teeth, which may be either cast or pressed out from sheet metal. These teeth are adjustably secured in slots 18 by means of bolts 22, having heads engaging the under side of the teeth and passing up through the slots. The edges of the teeth lie in notches 20, so that they are firmly locked against lateral movement. These teeth are especially designed to stir the surface of the soil in drought and when the weeds are small. It will readily be seen that more or less teeth may be used, there being two sets of slots, and that the teeth may be adjusted by simply moving them one notch to the right or left.

23 (see Figs. 8, 9, 11, and 12) denotes different styles of hoes, which are especially designed under different circumstances to throw the soil outward to hill up the plants. The standards for these different hoes are provided with open square heads having a hole through the top. The head of the bolt fills the space, the bolt passing up through the hole and through one of the slots in the platform. The slots in the platform permit the blades to be adjusted toward or from the plants, the ribs acting as guides and preventing twisting or turning of the standards.

In practice it is frequently desirable to use different kinds of teeth or blades at the same time. For example, the standard of the scuffle-hoe may be attached at one side of bar 11 and the standard 17ᵃ of the platform attached to the other side. It will of course be understood that the platform is adjustable by means of a bolt passing through slot 13, so as to give more or less pitch to the teeth carried thereby, or, as shown in Figs. 8, 9, and 11, hoe-blades of any preferred form may be attached to the platform.

When it is desired to use the implement as a straddle-cultivator, two wheels are used instead of one, as already explained, and as illustrated in Fig. 10. If necessary to place the wheels still farther apart, additional blocks may be used outside the ends of the branches of the arms, between the outer branches and the hubs of the wheels.

Having thus described my invention, I claim—

1. The upper arm having web 24, provided with slots and lug 25, and the lower arm having bar 11, in combination with the wheel, a bolt passing through the hub thereof and through the forward ends of the arms, and braces 3, passing through the slots in the web and bolted to bar 11 and to lug 25.

2. The combination, with the upper and lower arms, the wheel, bolt 5, passing through the forward ends of the arms and the hub of the wheel, and braces connecting said arms, of platform 17, which is secured to the lower arm and adapted for the attachment of teeth or blades.

3. The combination, with the lower arm, the wheel, bolt 5, and braces 3, of the upper arm bifurcated at its rear end and having slots 8 and the bolt-holes, and a handle adjustably secured to said upper arm by bolts passing through said bolt-holes and the slots.

4. In a cultivator, the combination, with an arm, 2, having at its rear end a bar provided with bolt-hole 12 and slot 13, of platform 17, having slots 18 for the adjustment of the teeth and blades, and a standard, 17ᵃ, having bolt-holes corresponding with hole 12 and slot 13.

5. In combination with the cultivator-frame having arm 2, the platform 17, having a standard, 17ᵃ, whereby it is attached and adjusted, slots 18, ribs upon its under side and notches in said ribs, which are engaged by the edges of cultivator-teeth, and bolts passing through said teeth and said slots, whereby the teeth are held in place.

In testimony whereof I affix my signature in presence of two witnesses.

EVERETT C. ELWOOD.

Witnesses:
A. M. WOOSTER,
BERTHA E. LEE.